United States Patent Office 2,917,528
Patented Dec. 15, 1959

2,917,528

ALKANOLAMINEALKANEPHOSPHONIC ACIDS AND SALTS THEREOF

William M. Ramsey, Downey, and Charles Kezerian, Los Angeles, Calif., assignors to Victor Chemical Works, a corporation of Illinois No Drawing. Application August 24, 1956
Serial No. 605,957

22 Claims. (Cl. 260—438)

This invention relates to alkanolaminealkanephosponic acids and salts thereof, chelates of same, and methods of producing said acids and salts wherein said acids and salts have the general formula:

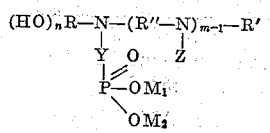

where $n$ is a number from 1 through 3, $m$ is an integer of 1 through 7, R is a hydrocarbon group having at least two carbon atoms, R″ is an alkylene group, Y is an alkylene and substituted alkylene group and R′ and Z are selected from the group consisting of hydrogen, alkyl, aryl, $-R(OH)_n$ and

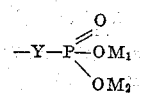

where $M_1$ and $M_2$ represent hydrogen and radicals which form salts therewith such as exemplified by metal cations.

Compounds of this type may be formed by the reaction of primary and secondary alkanolamines, polyalkanol primary and secondary amines, and primary and secondary alkanolpolyamines with haloalkanephosphonates in hot, alkaline, aqueous solution such as exemplified by the following general type reaction:

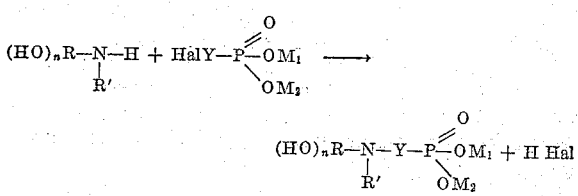

where HalY is a mono or polyhaloalkyl group or a mono or polyhalogenated substituted alkyl group, under alkaline conditions, which are necessary for efficiently carrying out the reaction. The reaction products are in the form of salts. Such salts may be converted to the free acids by further reaction with suitable strong inorganic acids, or ion exchange resins.

Some of the primary and secondary alkanolamines which may be used for the production of the compounds of this invention are:

Monoethanolamine
Diethanolamine
Phenyl-ethanolamine
Cyclohexanolamine
tris Methylolaminomethane
α-Methylbenzyl-ethanolamine
Di-isopropanolamine
Monobutanolamine
2-amino-2-methyl-propanediol-1,3
Dihydroxy-diethylenetriamine The above and similar primary and secondary amines react through the amino hydrogens with the halogen atoms of halogenated substituted alkylphosphonic acids, haloalkanephosphonic acids, or salts thereof to liberate hydrogen halide and form the compounds of this invention. The liberated hydrogen halides form base halides immediately from the bases employed in maintaining the alkalinity of the reaction mixtures.

Suitable haloalkanephosphonic acids include chloromethanephosphonic acids, β-chloroethylphosphonic acid, α,β-dichloroethylphosphonic acid, di- and trichloromethanephosphonic acids, bromomethanephosphonic acid, chloropropanephosphonic acid, and other haloalkanephosphonic acids, and salts thereof.

One or more or all of the hydrogen atoms on the nitrogen atoms in the alkanolamines shown above may be replaced with alkanephosphonic groups depending on the proportions of the alkanolamine and haloalkanephosphonic reactants employed in the above preferred method of making the products of this invention. In some instances the products may be made by reacting aminoalkanephosphonic compounds with a hydroyalkyl halide or an alkylene oxide, but in this specification only the preferred method will be illustrated.

EXAMPLE 1

210 g. (2.0 moles) of diethanolamine was mixed with 100 ml. of water. To this mixture, portionwise, was added 260 g. (2.0 moles) of chloromethylphosphonic acid and 50% caustic soda solution. During this gradual addition the mixture was maintained alkaline to Nile blue indicator and the temperature was kept below 50° C.

The mixture was then heated up to the boiling point (under reflux) and an additional amount of 50% caustic soda solution was added (to maintain Nile blue alkalinity) to a total of 480 g. (6.0 moles). Heating at or very near the boiling point was continued for 20 hours; the reaction mixture was then cooled somewhat, diluted with enough water to dissolve precipitated sodium chloride, filtered while still warm (through glass wool) and allowed to cool overnight.

Then the crystalline product was filtered off and dried. Yield of crystals: 390 g. (crop I), after drying at 95° C.

Mother liquor from crystal crop I was evaporated to a 350 ml. volume, sodium chloride was filtered off while hot, and the filtrate cooled slowly to produce 60 g. of crop II.

Further concentration of the mother liquor from crop II produces additional small amounts of the product, N-diethanolaminomethanephosphonate disodium salt, pentahydrate, $(HOCH_2CH_2)_2N-CH_2-PO_3Na_2 \cdot 5H_2O$. Total recovery: 450 g. after being dried at 95° C.

The product crystals contained small amounts of sodium chloride impurity, and this was largely eliminated by dissolving 120 g. crude product in 100 ml. of water at 70–80° C., decolorizing with activated charcoal, filtering while hot and allowing the liquor to cool and recrystallize. 20.35 g. of recrystallized $$(HOCH_2CH_2)_2N-CH_2PO_3Na_2 \cdot 5H_2O$$

dried at 90–95° C. to a constant weight (5 hrs.) showed a loss of 4.75 g. which corresponds to 4 moles of water; further drying at 120° C. yields the fifth mole of crystal water. The oven-dry anhydrous salt was white and stable.

The monohydrate salt was soluble to the extent of about 63.1 g. per 100 ml. of water at 30° C., and this solution has a density of 1.23.

Sodium hydroxide lowered the solubility in water and this addition of excess alkali was sometimes useful in separating the product crystals.

EXAMPLE 2

The same reactant quantities and materials were used as in Example 1, but the chloromethylphosphonic acid was dissolved in 200 ml. of water and then added to the undiluted diethanolamine together with 50% NaOH solution to maintain Nile blue indicator alkalinity.

The reaction mixture was then heated at 100° C. ±5° C. under reflux for 20 hours. Sodium chloride was filtered off while hot, and without any water dilution.

This liquid deposited some product crystals before filtration was complete, yet on cooling the filtrate to 0°–5° C., there was deposited 375 g. of crystals as a first crop.

After recrystallization from water, the diethanolamine methylphosphonate disodium salts analyzed as follows for nitrogen:

Table I

| Salt | Penta-hydrate [1] | Mono-hydrate [2] |
|---|---|---|
| Percent N, found | 4.12 | 5.50 |
| Percent N, theory | 4.20 | 5.36 |

[1] Air-dried.
[2] Dried to constant weight at 95–100° C.

The anhydrous disodium salt melted at 308–312° C. with decomposition.

The apparent reaction of this example was:

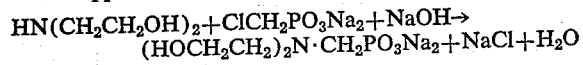

$$HN(CH_2CH_2OH)_2 + ClCH_2PO_3Na_2 + NaOH \rightarrow$$
$$(HOCH_2CH_2)_2N \cdot CH_2PO_3Na_2 + NaCl + H_2O$$

The reaction conditions may be varied from those chosen above, as shown in other examples. Caustic soda (sodium hydroxide) is convenient to use in the above reaction because the disodium salt of N-diethanolamine methanephosphonic acid is relatively easily separated by crystallization; but other basic materials may be used.

EXAMPLE 3

130 g. of 50% (by weight) solution of chloromethanephosphonic acid (0.5 mole), 52.5 g. of diethanolamine (0.5 mole), 50 ml. of water and 120 g. of 50% (by weight), NaOH solution were added, in order, with mixing, into a 500 ml. Erlenmeyer flask, and then heated under gentle reflux for 24 hours. The solution darkened in a few hours to a red-brown color.

The filtered, hot alkaline reaction mixture was evaporated to a 270 ml. volume in a Monel beaker and then allowed to cool. After seeding, filtering, washing lightly and drying the pentahydrate crop of crystals at 95° C. for 8 hours, 83 g. of N-diethanolamino-methanephosphonate disodium salt, monohydrate was obtained. A substantial portion of the sodium chloride formed in the reaction remained in solution.

EXAMPLE 4

The same quantities of the same reactants as set forth in Example 3 were mixed with 400 ml. of water, with cooling, and with the pH kept near 12 (pHydrion paper) by the stepwise addition of a 50% caustic soda solution. The mixture was refluxed gently for 24 hours and until a total of 120 g. of 50% (by weight) caustic soda had been used.

The mixture was then treated as in Example 3 to give a first crop of 74 g. of colorless N-diethanolamino-methanephosphonate disodium salt, monohydrate crystals.

EXAMPLE 5

130 g. of 50% chloromethanephosphonic acid solution (0.5 mole) was cooled and treated with 52.5 g. (0.5 mole) diethanolamine dissolved in 25 ml. of water. The mixture was adjusted to Nile blue indicator alkalinity with 50% (by weight) potassium hydroxide solution and then heated at 95–100° C. for 24 hours. During this time an additional amount of 50% potassium hydroxide solution was added to maintain Nile blue indicator alkalinity and until a total of 170 g. of alkaline solution had been used.

The reaction liquid was evaporated to a 150 ml. volume, filtered while hot to remove potassium chloride crystals and allowed to cool. Neither cooling nor standing in a vacuum desiccator gave crystals of the very soluble and hygroscopic dipotassium salt of diethanolaminomethanephosphonic acid from its concentrated aqueous solution.

Continued concentration of the product solution finally gave crystals of the dipotassium salt, together with small amounts of potassium chloride.

Pure diethanolamino-methanephosphonic acid was prepared from the reaction solution of the dipotassium salt by passing the solution through an ion exchange resin (acid form). The acidic effluent was concentrated by evaporation under vacuum and treated with a 50% NaOH solution at about 80° C. Ethanol was added and mixture cooled to about 5° C. to crystallize out the disodium salt pentahydrate. The crystalline product was then dissolved in water and passed through an ion exchange resin (acid form) and the acid effluent concentrated, treated with ethanol and cooled to crystallize the pure diethanolamino-methanephosphonic acid which had a melting point of 144–146° C.

EXAMPLE 6

A solution of the disodium salt of chloromethanephosphonic acid was made by neutralizing 130 g. (0.5 mole) of 50% (by weight) solution of chloromethanephosphonic acid with 80 g. of 50% (by weight) NaOH solution (1.0 mole). This solution was added with cooling to 52.5 g. of diethanolamine (0.5 mole) in 100 ml. of water. Then, 62 g. of sodium carbonate monohydrate (0.5 mole) was added. The mixture was digested at 95–100° C. for 24 hours, concentrated to a 270 ml. volume, filtered while hot and allowed to cool. The filtrate, after seeding with disodium N-diethanolamino-methanephosphonate pentahydrate, gave a good crop of product crystals. The product was filtered, and dried at 95–100° C. to a constant weight to yield 72 g. of disodium diethanolamino-methanephosphonate monohydrate.

Either ammonia or an excess of diethanolamine itself was alkaline enough to cause the desired condensation, but isolation of the product is easier as the disodium salt.

Where the diethanolamine or ammonia was used as the base, the salt solutions were identified by conversion to the acid in the manner described in Example 5.

Recrystallized disodium diethanolamino-methanephosphonates analyzed as shown below. The pentahydrate was carefully air-dried material; the monohydrate had been dried to a constant weight at 95° C.; the anhydrous salt was dried at 120° C.

Table II

|  | Found | Theory |
|---|---|---|
| (a) Pentahydrate crystals: | | |
| Percent Nitrogen (N) | 4.1 | 4.20 |
| Percent Phosphorus (P) | 9.25 | 9.31 |
| Molecular weight by titration | 336 | 333 |
| Titration inflexion points— | | |
| (1) pH | 3.1 | |
| (2) pH | 7.1 | |
| (b) Monohydrate: | | |
| Percent Nitrogen (N) | 5.3 | 5.36 |
| Percent Phosphorus (P) | 11.93 | 11.87 |
| Molecular weight by titration | 262 | 261 |
| Titration inflexion points— | | |
| (1) pH | 3.2 | |
| (2) pH | 7.3 | |
| (c) Anhydrous Disodium Salt: | | |
| Percent Nitrogen (N) | 5.7 | 5.76 |
| Percent Phosphorus (P) | 12.8 | 12.76 |
| Molecular weight by titration | 243 | 243 |
| Titration inflexion points— | | |
| (1) pH | 3.1 | |
| (2) pH | 7.1 | |
| Percent Residue on Ignition (as $Na_4P_2O_7$) | 54.6 | 54.73 |
| Percent $Na_4P_2O_7$ in Ignition residue (based on original sample) | 54.1 | 54.73 |
| Percent $Na_4P_2O_7$ in Ignition residue | 99.1 | 100 |

EXAMPLE 7

Crystals of the free N-diethanolamino-methanephosphonic acid were prepared by passing a solution containing 25 g. of the anhydrous disodium salt dissolved in 200 ml. of distilled water through a column of the acid form of Amberlite IR-100 ion exchange resin and collecting the acidic portion of the effluent. After the effluent was evaporated to a 100 ml. volume of 80–90° C., the volume was further decreased to 40 ml. in a desiccator. One liter of dry ethanol was added and the mixture was cooled to 0° C. After standing one day, the precipitated crystals were filtered off and stored in a vacuum desiccator.

This procedure was repeated twice more to obtain a combined yield of 28 g. of the free acid for analysis (yield: 76% of theory).

By the above procedure, free N-diethanolamino-methanephosphonic acid is a well formed, white crystalline material that is extremely soluble in water.

Table III
ANALYTICAL TESTS ON $(HOCH_2CH_2)_2N \cdot CH_2PO_3H_2$

|  | Found | Theory |
|---|---|---|
| Melting Point, °C | 144–146 |  |
| Percent Nitrogen (N) | 6.9 | 7.04 |
| Percent Phosphorus (P) | 15.5 | 15.58 |
| Molecular weight by titration | 197 | 199 |
| Titration inflexion points: |  |  |
| (1) pH | 7.3 |  |
| (2) pH | 3.1 |  |

One of the most interesting properties of the diethanolamine-phosphonates is their ability to form chelates with multivalent metal ions in solution. Thus, our chelating materials may be used to sequester multivalent metal ions in combination with detergents as well as in dyeing processes wherein the sequestering of multivalent metal ions is desirable. Surprisingly, several of these metal chelates are stable in solution at quite a high pH; for example, the chelate formed from 2 moles of the diethanolamino-methanephosphonate per 1 mole of ferric iron was found stable at or above a pH of 12, or in 5% to 10% aqueous ammonia solution for a period of three months or longer. This iron chelate was found capable of providing iron for the greening of chlorotic plants, such as beans attempting to grow in calcareous, chlorosis-producing soil.

Chelant power was shown by mixing 10 ml. of 0.1 molar metal ion solution with 75 ml. of distilled water, and adding 10 ml. of 0.2 molar diethanolamine-methanephosphonic acid disodium salt, and adjusting the pH to 10 (or other specified alkaline pH).

Table IV
SOLUTION'S CHARACTER AT pH OF 10 (ROOM TEMPERATURE)

| Metal Ion and Valence | With chelant | Without chelant |
|---|---|---|
| Al (III) (pH of 9) | clear soln. (pH of 9) | white precipitate (pH of 9). |
| Cu (II) | vivid blue solution | greenish precipitate. |
| Mn (II) | amber soln. (precipitates slightly after several days). | rust-colored precipitate at once. |
| Ni (II) | pale green solution | green precipitate. |
| Pb (II) | clear solution | white precipitate. |
| Zn (II) | pale amber solution | Do. |
| Ce (IV) | do | Do. |
| Ag (I) | clear soln. (slowly precipitates under influence of light). | dark precipitate at once. |
| Ca (II) (pH of 11) | white precipitate | white precipitate. |
| Sn (II) | precipitate which slowly dissolves. | Do. |

Chelation of ferric-iron in aqueous solutions is of particular interest with diethanolamino-methanephosphonic acid and its salts. Ten ml. of 0.1 molar solution of ferric chloride ($FeCl_3$) were diluted with 50 ml. of distilled water and varying volumes of approximately 0.1 molar disodium diethanolamino-phosphonate were added. The pH was adjusted to 9.0 and the following observations were noted:

Table V

| Approx. mole ratio chelant: Fe | Solution Characteristics | |
|---|---|---|
|  | Cool (Room Temp.) | After Boiling |
| 1:1 | orange solution | red precipitate. |
| 3:2 | yellow solution | Do. |
| 2:1 | colorless solution | orange solution. |
| 5:2 | do | colorless solution. |
| (Fe only) | red precipitate | dark red precipitate. |

These data indicated that 2 moles of chelant were required per mole of ferric-iron for most stable, soluble chelate formation, with a weaker complex at 1:1 mole ratio.

The pH was varied in the following tests using 50 ml. of water, 10 ml. of 0.1 molar $FeCl_3$ and 25 ml. of 0.1 molar disodium diethanolamino-methanephosphonate (a slight excess of chelant, 5:2 mole ratio):

Table VI

| pH | | Solution Characteristics | |
|---|---|---|---|
| At start | After heating | Cool (Room Temp.) | Hot solution |
| 6.0 | 5.85 | greenish soln | amber soln. |
| 7.0 | 6.05 | yellowish soln | orange solution. |
| 8.0 | 7.2 | pale amber soln | Do. |
| 9.0 | 9.1 | colorless soln | yellowish soln. |
| 9.5 |  | do | colorless soln. |
| 10.0 | 9.4 | do | Do. |
| 11.0 | 9.7 | do | Do. |
| 12.0 | 11.3 | do | Do. |

No floc or precipitate appeared in any of these tests, this showed a very extraordinary stability for the ferric chelate since the best known commercial chelating materials will form well-developed ferric-iron flocs or precipitates at a pH of 9 to 11.

The ferric chelate solutions after acidification with dilute nitric acid (as well as the original chelant solution) show no inorganic orthophosphate precipitate with a molybdate reagent.

At a pH of 6–13, the diethanolamino-methanephosphonate aqueous solutions were quite stable, showing substantially unchanged chelating power for ferric-iron even after heating at 85–90° C. at the designated pH for 72 hours before iron was added. The following tests were made at room temperature using a 5:2 chelant: $Fe^{+++}$ mole ratio (slight excess of chelant):

Table VII

| pH | Fe-Chelate solution characteristics | |
|---|---|---|
|  | Fresh solution | After 14 days |
| 6 | pale yellow | pale greenish. |
| 7 | do | pale yellow. |
| 8 | pale amber | pale yellow. |
| 9 | colorless | orange. |
| 10 | do | pale amber. |
| 11 | do | pale yellowish. |
| 12 | do | colorless. |
| 13 | slight floc | Do. floc. |

The calcium chelate of diethanolamino-methane-phosphonate ion was less stable than the ferric-iron chelate. Added orthophosphate ion (pH 9.5) precipitated calcium phosphate but not iron phosphate from a mixed Ca—Fe chelate solution.

Near a pH of 7 only, strong solutions of the Fe (III)-chelate tended to form stiff gels on standing; this made isolation of the solid Fe-chelate difficult, but one probable structure was $[(HOCH_2CH_2)_2N—CH_2PO_3] \cdot Fe \cdot OH$. The gels reconstitute to liquids when water is added and mixed therewith.

Stability of the ferric chelate with calcium competing was also shown by lack of breakdown or ferric precipitate formation when 150 ml. of complex solution (0.01 mole of ferric ion and 0.025 mole of disodium diethanolaminomethanephosphonate) were passed, at the rate of 1 drop per second, through a white, granular limestone column, 1.5 cm. in diameter x 60 cm. in length.

A partial separation of the ferric complex was effected by adjusting a 0.1 molar solution of the 2:1 mole ratio complex to a pH of 6. Part of the complex precipitated as a white floc. After oven-drying, this floc analyzed as follows:

| | Percent |
|---|---|
| Phosphorus (P) | 11.55 |
| Nitrogen (N) | 5.36 |

Theoretical values for $$[(HOCH_2CH_2)_2N \cdot CH_2PO_3] \cdot Fe \cdot Na$$

were 11.48% P, 51.19% N and 20.69% Fe.

The solid, insoluble diethanolamine-methanephosphonic-iron complex may be prepared by an alternate procedure. When diethanolamine - methanephosphonic acid was slurried with freshly precipitated ferric hydroxide in a mole ratio of 2:1 and the pH adjusted to approximately 6 to 7, a greenish-white amorphous precipitate formed after several days, leaving a red mother liquor. The precipitate was only slightly soluble in water and contained over 80% of the total iron input. The precipitate was dried to a constant weight at 100° C. It analyzed 12.25% P and 20.3% Fe.

The phosphorus content corresponds closely to that given above. This substantiates the 1:1:1 ratio of P:N:Fe of the above formula. The precipitate redissolves if the slurry pH is adjusted either above or below the pH range in which it was formed, though some iron separates out at high pH values.

The 2:1 chelate solution of diethanolamine-methanephosphonate and Fe-ion was also stable in rather strong ammonia water. Fifty ml. of ammonia water (28% $NH_3$) were diluted with varying volumes of water and 10 ml. of a solution of 0.1 molar in ferric-iron and 0.2 molar in disodium diethanolamino-methanephosphonic acid. At room temperature no iron floc formed in any solution described below:

Table VIII

| Ml. of 28%—$NH_3$ Ammonia Water | Ml. of Added Water | Resultant Soln. after Standing | |
|---|---|---|---|
| | | 1 day | 6 days |
| 50 | 200 | clear. | clear. |
| 50 | 150 | clear. | clear. |
| 50 | 100 | clear. | clear. |
| 50 | 50 | clear. | clear. |
| 50 | 25 | clear. | clear. |

For comparison purposes, other known iron chelate solutions containing 55 mg. of iron were added to 50 ml. of 28%-$NH_3$ ammonia water diluted with 150 ml. of water with the following results (room temperature):

Table IX

| Iron Chelate | Resultant Solution |
|---|---|
| Ethylenediamine tetracetate (12% Fe) | Red floc and precipitate. |
| Diethylenetriamine pentacetate (12.1% Fe) | Rust-red floc and precipitate. |

Other alkanolamines were readily reacted with chloromethanephosphonates to produce alkanolaminophosphonates that had valuable chelating properties, particularly in regard to ferric iron.

0.2 mole of monoethanolamine was added to 25 ml. of water and maintained below 55° C., 0.4 mole of chloromethanephosphonic acid and 0.8 mole of 50% (wt.) NaOH solution were added at Nile blue indicator alkalinity. The mixture was heated to boiling for 16 hours and Nile blue alkalinity was maintained by the addition of further, small, amounts of caustic soda until a total of 1.2 moles had been used. After cooling and filtering to remove salt (NaCl), the dilute solution of the reaction product sequesters calcium weakly in cool, aqueous solution.

From this solution of $HOC_2H_4N(CH_2PO_3Na_2)_2$, stable, soluble cupric and ferric chelates may be formed at a mole ratio of 2 moles of the reaction product to 1 mole of cupric-copper or ferric-iron. These chelate solutions were stable, when cooled, at a pH of 6 to 11, and at a pH of 6 to 10 at 90° C. One:one mole ratio complexes were not quite as stable. The starting reactants gave no stable iron complex at a pH of 6 to 10.

Insoluble zinc, lead and calcium salts of monoethanolamine bis-N-methanephosphonic acid were prepared as follows:

The dizinc salt was prepared by treating 50 ml. of a molar solution of tetrasodium monoethanolamine N,N-dimethanephosphonate, in 100 ml. of water with 100 ml. of 1.0 M zinc chloride solution. The mixture was heated below boiling in order to promote precipitation. A microcrystalline insoluble product formed immediately. After filtering, washing with several portions of ethanol, and drying the product at 105–110° C., it analyzed 16.53% P. This corresponds with the theoretical value of 16.54% P for the formula $$HOCH_2CH_2N(CH_2PO_3Zn)_2$$

The dilead salt was prepared in a similar manner except that the crystalline precipitate was washed with hot water to wash out by-product soluble lead salts. The dilead monoethanolamine bis - N - methanephosphonate $HOCH_2CH_2N(CH_2PO_3Pb)_2$ after drying 16 hours at 120° C. analyzed 9.13% P compared to the theoretical value of 9.40% P.

The dicalcium monoethanolamine bis-N-methanephosphonate $HOCH_2CH_2N(CH_2PO_3Ca)_2$ was prepared by combining 100 ml. of a 1.0 M solution of disodium monoethanolamine bis-N-methanephosphonate with 200 ml. of 1.0 M calcium chloride solution. The precipitated micro-crystalline product, dried at 105° C., had a phosphorus content of 19.14% compared to the calculated value of 19.46%.

EXAMPLE 9

Monoethanolamine bis-N-methanephosphonic acid was prepared by converting the above calcium salt to the acid in the following manner:

200 ml. of a 0.2 mole tetrasodium monoethanolamine N,N-dimethanephosphonate was mixed with 200 ml. of water and treated with 400 ml. of 1.0 M calcium chloride solution. The precipitated calcium salt was separated, washed with boiling water.

The product was suspended in 400 ml. of water and treated with 27 g. (0.3 mole) of oxalic acid. The precipitated calcium oxalate was filtered off, and the filtrate passed through an ion exchange resin (acid form) to remove any remaining cations. The filtrate was then concentrated under vacuo to a viscous, tan, hygroscopic oil. Analysis of the product showed it to have substantially the formula $HOCH_2CH_2N(CH_2PO_3H_2)_2$ with titration inflexion points at a pH of 3.5 and 9.2.

By controlling the reacting proportions of a primary alkanolamine and the chloroalkanephosphonate, it is possible to produce a monoalkanol monoalkanephosphonate secondary amine which is capable of further reaction with suitable substituents, or which, is itself a highly suitable chelating agent. Such reaction is illustrated by the following equation:

$$HOCH_2CH_2NH_2 + ClCH_2PO_3Na_2 + NaOH \rightarrow$$
$$HOCH_2CH_2NHCH_2PO_3Na_2 + NaCl + H_2O$$

EXAMPLE 10

120 g. (2 moles) of monoethanolamine was placed in 200 ml. of water, and while cooling and stirring, 307 g. of 84% chloromethanephosphonic acid was added together with 50% caustic soda solution in an amount sufficient to maintain the pH of the reaction mixture above 10.0.

After 24 hours reflux, the reaction mixture was evaporated below one liter, cooled, filtered and diluted to one liter volume to give a one molar solution of the product, disodium monoethanolamine N - methanephosphonate ($HOCH_2CH_2NHCH_2PO_3Na_2$). When used at a 2:1 ratio of the compound to metal ion, both ferric and cupric ions were successfully chelated at a pH of 10.0.

The zinc salt of the above compound was prepared by combining 50 ml. of the above molar solution of disodium monoethanolamine N-methanephosphonate with 50 ml. of one molar zinc chloride solution. The precipitated crystalline product, $HOCH_2CH_2NHCH_2PO_3Zn$, was separated, washed with ethanol and dried at 110° C. It analyzed 14.08% P (theory 14.19% P).

EXAMPLE 11

One mole of trimethylolaminomethane $$(HOCH_2)_3CNH_2$$

was reacted with 2 moles of chloromethanephosphonic acid under hot alkaline conditions such as those described in Example 1. The reaction mixture contains tetrasodium trimethylolamine bis-N-methanephosphonate. The product, when used at a 2:1 compound to metal ion ratio, will chelate both cupric and ferric ions at pH values from 6 to 10.

Identification was made by precipitation and analysis of the barium salt. Fifty ml. of one M solution of the above product was combined with 100 ml. of one M barium chloride solution. The precipitated micro-crystalline product was separated and dried at 120° C. It analyzed 11.07% P compared to the theoretical value of 11.28% for the formula $(HOCH_2)_3CN(CH_2PO_3Ba)_2$.

The dilead salt was also prepared in a similar manner and analyzed 8.08% P (theory 8.62).

EXAMPLE 12

The free acid, trimethylolaminomethane N,N-dimethanephosphonic acid was prepared by precipitating the calcium salt and treating the calcium salt with oxalic acid to convert the product to the free acid with precipitation of insoluble calcium oxalate. The calcium oxalate was filtered off and the filtrate concentrated to a clear, viscous, hygroscopic oil. Molecular weight determination and titration pH inflexion points showed the oil product to be substantially the pure free acid (mol. wt. of 316; theory 309) (inflexion pH 3.5 and 9.0).

EXAMPLE 13

One mole of 1,1-dimethylol-1-aminoethane $$CH_3(CH_2OH)_2CNH_2$$

was reacted with 2 moles of chloromethanephosphonic acid under hot alkaline conditions such as those described in Example 1 while maintaining a pH of above 11.0 at a temperature near boiling for 24 hours. The reaction mixture which contained the tetrasodium 1,1-dimethylol-1-aminoethane bis-N-methanephosphonate was successfully used to chelate cupric and ferric ions at a 2:1 chelate: metal ion ratio.

Identification of the compound was made by precipitation of the crystalline calcium salt. Analysis of the calcium salt showed a phosphorus content of 17.08% compared to the theoretical value of 16.8% P for the formula $CH_3(CH_2OH)_2CN(CH_2PO_3Ca)_2$.

EXAMPLE 14

One mole (163 g.) of triethyleneglycolaminomethylether (polyglycolamine, H-163), $$HO(CH_2CH_2O)_3CH_2NH_2$$

in 175 ml. of water was treated with 260 g. (2.0 moles) of chloromethanephosphonic acid and 350 g. of 50% (by weight) caustic soda at 100° C., followed by the addition of 160 g. of 50% NaOH during a 24 hour reflux period (at pH of 11–12). The resulting solution contains tetrasodium triethyleneglycolaminomethylether bis-N-methanephosphonate which chelates cupric ions well at a pH of 10.0 in a 2:1 chelate to metal ion ratio.

Identification of the compound was made by precipitation and analysis of the dilead salt. It had a phosphorus content of 7.54% compared to the theoretical value of 7.98% P for $HO(CH_2CH_2O)_3CH_2N(CH_2PO_3Pb)_2$.

EXAMPLE 15

The free acid of the compound of Example 14 was prepared by converting the tetrasodium salt to the dibarium salt and then liberating the free acid by treating with oxalic acid. The free acid solution was concentrated and dried several days in a desiccator to yield a viscous oil having a molecular weight of 398 (theory 351), and titration inflexion points at a pH of 3.2 and 9.5.

EXAMPLE 16

One mole of N,N'-bis(hydroxyethyl) ethylenediamine, $[(HOCH_2CH_2)—NHCH_2]_2$, was reacted with 2 moles chloromethanephosphonate at Nile blue indicator alkalinity under reflux for 12 hours. After concentration and hot filtration removal of precipitated NaCl, there was obtained a solution of the tetrasodium salt of the acid $[—CH_2—N—(CH_2CH_2OH)CH_2PO_3H_2]_2$. The reaction product chelated ferric and cupric ions nicely at a pH of 10, at a mole ratio of chelant: Metal=1:1. A slight excess of chelant gave a heat-stable chelate solution, and the cool chelate solution was stable at a pH 5 to 12. The reaction product also formed a chelate with calcium ion (pH of 8).

Identification of the compound was made by precipitation and analysis of the dibarium salt. It had a phosphorus content of 10.23% compared to a theoretical of 10.21% for $[—CH_2N(CH_2CH_2OH)CH_2PO_3Ba]_2$.

EXAMPLE 17

One mole aminoethylethylolamine, $$HOCH_2CH_2NHCH_2CH_2NH_2$$

and 3 moles of chloromethanephosphonic acid were reacted in a hot caustic soda solution to give a solution of hexasodium hydroxyethylethylenediamine tris-N,N,N'-methanephosphonate which chelates cupric and ferric ions very strongly at a 1:1 chelate to metal ion ratio.

Identification was made by precipitation and analysis of the tricalcium salt. The tricalcium salt had a phosphorus content of 18.95% compared to 18.60% for the compound $$HOCH_2CH_2N(CH_2PO_3Ca)CH_2CH_2N(CH_2PO_3Ca)_2$$

EXAMPLE 18

Tetrasodium 2-hydroxy 1,3-propylenediamine bis-N, N'-methanephosphonate was prepared by reacting one mole of 2-hydroxy,1-3-propylenediamine, $$H_2NCH_2CH(OH)CH_2NH_2$$

with 2 moles of disodium chloromethanephosphonate in a hot caustic soda solution. The product chelated ferric and cupric ions very strongly at a pH of about 10.0 in a 1:1 compound to metal ion ratio.

The dicalcium salt was precipitated by treatment with a calcium chloride solution. The crystalline dicalcium 2-hydroxy 1,3-propylenediamine bis N,N'-methanephosphonate had a phosphorus content of 17.83% (theory 17.51%).

EXAMPLE 19

One mole (165 g.) of α-methylbenzylethanolamine, $C_6H_5CH(CH_3)NHCH_2CH_2OH$, was reacted with 0.25 mole of chloromethanephosphonic acid and 5 ml. of water for 20 hours at 140° C. The thick liquid reaction mixture was cooled, diluted with 250 ml. of water, 60 g. of 50% NaOH solution (0.75 mole) and 350 ml. of ethanol. The solution was then cooled to 0° C. and the product crystallized out and separated by filtration. The separated crystalline product was washed with 75 ml. of ethanol and dried at room temperature. On heating to constant weight at 100° C. the product lost 5 moles of water of crystallization. The anhydrous product (37.8 g.) had a molecular weight of 301 by titration (theory 303), a nitrogen content of 4.45% compared to 4.62% for the formula $$C_6H_5CH(CH_3)N(CH_2CH_2OH)CH_2PO_3Na_2$$

The product chelated cupric ions at a pH of about 10.0 in a 2:1 compound to metal ion ratio.

Diethanolamino-N-methanephosphonates (i.e. diethanolamino-methanephosphonates) form water-soluble chelates with a number of multivalent metallic ions. The ferric-iron chelate is not only stable in acidic and neutral solution, but outstandingly stable under very high pH (alkalinity) conditions.

Soil application of the ferric chelate gave good results in supplying iron to chlorotic plants growing in alkaline, calcareous soil and of greening the plants.

Other alkanolamine types also react similarly with chloromethanephosphonic acid and salts thereof to yield products which have iron chelating characteristics.

The foregoing detailed description has been given for clearness of understanding only, and no unnecessary limitations should be understood therefrom, as modifications will be obvious to those skilled in the art.

What is claimed is:

1. A constituent from the group consisting of:
   (a) A compound of the formula:

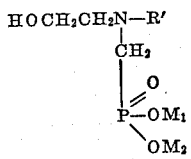

wherein R' is a member from the group consisting of —H, —CH$_2$CH$_2$OH, and

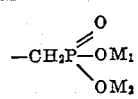

substituents and where M$_1$ and M$_2$ are members of the group consisting of (1) hydrogen and (2) salt forming substituents; and
   (b) Chelates comprising the compounds of (a) and polyvalent metal ion.

2. A compound of the formula:

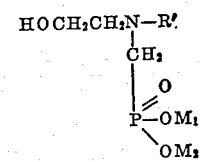

wherein R' is a member from the group consisting of —H, —CH$_2$CH$_2$OH, and

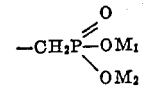

substituents and where M$_1$ and M$_2$ are members of the group consisting of (1) hydrogen and (2) salt forming substituents.

3. Chelate comprising a compound of claim 2 and polyvalent metal ion.

4. A compound of the formula:

$$(HO-CH_2CH_2)_2N-CH_2-PO_3H_2$$

5. Metal salt of the compound of claim 4.
6. Disodium salt of the compound of claim 4.
7. A compound of the formula:

$$HO-CH_2CH_2-N-(CH_2-PO_3H_2)_2$$

8. Metal salt of the compound of claim 7.
9. A compound of the formula:

$$HO-CH_2CH_2-NH-CH_2PO_3H_2$$

10. Metal salt of the compound of claim 9.
11. A chelate comprising the compound as defined in claim 4 and ferric iron ion.
12. A chelate comprising the compound as defined in claim 4 and cupric ion.
13. A chelate comprising the compound as defined in claim 5 and ferric iron ion.
14. A chelate comprising the compound as defined in claim 5 and cupric ion.
15. A chelate comprising the compound as defined in claim 7 and ferric iron ion.
16. A chelate comprising the compound as defined in claim 7 and cupric ion.
17. A chelate comprising the compound as defined in claim 8 and ferric iron ion.
18. A chelate comprising the compound as defined in claim 8 and cupric ion.
19. A chelate comprising the compound as defined in claim 9 and ferric iron ion.
20. A chelate comprising the compound as defined in claim 9 and cupric ion.
21. A chelate comprising the compound as defined in claim 10 and ferric iron ion.
22. A chelate comprising the compound as defined in claim 10 and cupric ion.

References Cited in the file of this patent
UNITED STATES PATENTS 2,227,963    Dickey et al _____ Jan. 7, 1941

UNITED STATES PATENT OFFICE
CERTIFICATE OF CORRECTION

Patent No. 2,917,528                        December 15, 1959

William M. Ramsey et al.

It is hereby certified that error appear in the printed specification of the above numbered patent requiring correction and that the said Letters Patent should read as corrected below.

Column 1, line 16, for "ponic" read -- phonic --; line 41, for "haloalkanephosphos-" read -- haloalkanephospho- --; line 42, for "soultion" read -- solution --; line 52, for "where" read -- wherein --; column 2, line 22, for "hydroyalkyl" read -- hydroxyalkyl --; column 5, line 8, for "volume of" read -- volume at --; line 28, Table III, first column thereof, fourth line, for "wight" read -- weight --; column 6, line 69, for "methane-phos-" read -- methanephos- --; column 8, line 32, for "mircocrystalline" read -- microcrystalline --.

Signed and sealed this 25th day of October 1960.

(SEAL)
Attest:

KARL H. AXLINE                           ROBERT C. WATSON
Attesting Officer                     Commissioner of Patents